(12) United States Patent
Ziolek et al.

(10) Patent No.: US 12,485,813 B2
(45) Date of Patent: Dec. 2, 2025

(54) CARGO MANAGEMENT SYSTEM USING A CARGO NET SPANNER

(71) Applicants: Hyundai Motor Company, Seoul (KR); Kia Corporation, Seoul (KR)

(72) Inventors: Scott Ziolek, Ann Arbor, MI (US); Christopher T. Boehme, Superior Township, MI (US); Jason J. Lilburn, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 436 days.

(21) Appl. No.: 18/089,156

(22) Filed: Dec. 27, 2022

(65) Prior Publication Data

US 2024/0208397 A1    Jun. 27, 2024

(51) Int. Cl.
*B60P 7/08* (2006.01)
*B60R 7/00* (2006.01)

(52) U.S. Cl.
CPC ............ *B60P 7/0876* (2013.01); *B60R 7/005* (2013.01)

(58) Field of Classification Search
CPC ......... B60P 7/0876; B60R 7/005; B60R 7/08; B65D 33/077; B65D 33/007; B65B 43/34; F16B 7/0433; F16L 3/223
See application file for complete search history.

(56) References Cited

U.S. PATENT DOCUMENTS

| | | | |
|---|---|---|---|
| 5,121,958 A | 6/1992 | Goeden et al. | |
| 5,340,004 A * | 8/1994 | Moore | B60R 7/02 224/404 |
| 5,452,973 A | 9/1995 | Arvin | |
| 5,551,726 A | 9/1996 | Ament | |
| 6,334,562 B1 * | 1/2002 | Ament | B60R 7/005 224/543 |
| 6,345,944 B1 | 2/2002 | Florence | |

(Continued)

FOREIGN PATENT DOCUMENTS

| | | | | |
|---|---|---|---|---|
| EP | 0859708 B1 | | 8/2004 | |
| FR | 2500258 A | * | 8/1982 | ............ A01G 17/06 |
| KR | 20060016962 A | * | 2/2006 | ............ B60R 7/005 |

OTHER PUBLICATIONS

TN TrunkNets Inc Store; Amazon.com website; https://a.co/d/hqo3dEt; accessed May 5, 2025; published 3/60/2020. (Year: 2020).*

*Primary Examiner* — Daniel J Colilla
(74) *Attorney, Agent, or Firm* — Fox Rothschild LLP

(57) ABSTRACT

Provided are a cargo net spanner and a cargo management system including the cargo net spanner. The spanner includes a tab protruding longitudinally from a proximal end of the spanner; a first cord attachment portion proximal to the tab; and a second cord attachment portion at a distal end of the spanner. The tab is configured to allow a user to control a movement of the spanner. The first cord attachment portion is configured to engage with a first cord. The second cord attachment portion is configured to engage with a second cord. The system includes a cargo net and the cargo net spanner(s). When the first cord and the second cord attachment portions are respectively engaged with the first and the second cords, the spanner positions between the first cord and second cord such that an internal space formed by the cargo net becomes more accessible by the user.

11 Claims, 9 Drawing Sheets

(56) References Cited

U.S. PATENT DOCUMENTS

| | | |
|---|---|---|
| 6,554,339 B1 | 4/2003 | Moore |
| 8,192,118 B2 | 6/2012 | Zahorec et al. |
| 2009/0288787 A1 | 11/2009 | Yoshida |

* cited by examiner

CARGO MANAGEMENT SYSTEM USING A CARGO NET SPANNER

BACKGROUND

Technical Field

Embodiments of the present disclosure relate to a cargo net spanner and a cargo management system including the cargo net spanner.

Background

Consumers have demanded cargo management flexibility for a variety of different load cases. Also, autonomous vehicle technologies will likely increase the demand for more reconfigurable features. Cargo nets having been used as a barrier, cover, or envelope are fairly common to secure items; however, focus has been primarily on creating tension in the net or reconfiguring attachment locations to secure the cargo.

In contrast, little attention has been given to increasing the utility, particularly in terms of access, placement, and retrieval of items within a cargo net envelope. Cargo net envelope opening is difficult to access because bungie pulls front and back edges together. To hold the opening wide, a user must hold the opening open with one hand and drop an item into the opening with the other hand.

The matters described in this background section are intended to promote an understanding of the background of the disclosure and may include matters that are not already known to those of ordinary skill in the art.

SUMMARY

The purpose and advantages of the present invention will be set forth in and apparent from the description that follows, as well as will be learned by practice of the invention. Additional advantages of the invention may be realized or obtained by the methods and systems particularly pointed out in the written description and claims hereof, as well as from the appended drawings.

It may be an object of embodiments of the disclosure to provide a cargo management system including at least one deployable cargo net spanner that is configured to position between two cords, parts of the envelope cargo net (e.g., between trailing and leading edges, between side trailing and side leading edges, between net connectors connected to trailing and leading edges, respectively), and thus holds the top of the envelope cargo open. This cargo management system including the spanner allows a user to access, place or retrieve items in the cargo net envelope. The system also improves customer usage of already provided feature—the cargo net. The system is also advantageous to other existing solutions that would similarly improve cargo net usage because it has a lower unit cost.

An embodiment of the present disclosure provides a cargo net spanner. The spanner may include a tab protruding longitudinally from a proximal end of the spanner; a first cord attachment portion proximal to the tab; and a second cord attachment portion at a distal end of the spanner. The tab may be configured to allow a user to control a movement of the spanner. The first cord attachment portion may be configured to engage with a first cord. The second cord attachment portion may be configured to engage with a second cord.

According to an exemplary embodiment, the first cord attachment portion may include a groove or an edge with an opening configured to be removably engaged with the first cord. The second cord attachment portion may include a groove or an edge with an opening configured to be removably engaged the second cord.

According to an exemplary embodiment, the first cord attachment may be configured to engage with the first cord in a non-removable way. The second cord attachment may be configured to engage with the second cord in a non-removable way.

According to an exemplary embodiment, the spanner may be rotatable around the first cord when the spanner engages only with the first cord by the first cord attachment portion.

In another embodiment, a cargo management system is provided. The system may include a cargo net and a cargo net spanner. The cargo net may include a flexible netting surrounded by a perimeter cord and configured to be folded to form an internal space. The perimeter cord may include a trailing edge and a leading edge. The cargo net spanner may include a tab protruding longitudinally from a proximal end of the spanner; a first cord attachment portion proximal to the tab; and a second cord attachment portion at a distal end of the spanner. The tab may be configured to allow a user to control a movement of the spanner. The first cord attachment portion may be configured to engage with a first cord. The second cord attachment portion may be configured to engage with a second cord. When the first cord and the second cord attachment portions are respectively engaged with the first and the second cords, the spanner may position between the first cord and second cord such that the internal space becomes more accessible by the user.

In another embodiment, a cargo management system is provided. The system may include a cargo net and a plurality of cargo net spanners. The cargo net may include a flexible netting surrounded by a perimeter cord and configured to be folded to form an internal space. The perimeter cord may include a trailing edge and a leading edge. Each of the cargo net spanners may include a tab protruding longitudinally from a proximal end of the spanner; a first cord attachment portion proximal to the tab; and a second cord attachment portion at a distal end of the spanner. The tab may be configured to allow a user to control a movement of the spanner. The first cord attachment portion may be configured to engage with a first cord. The second cord attachment portion may be configured to engage with a second cord. When the first cord and the second cord attachment portions are respectively engaged with the first and the second cords, the spanner may position between the first cord and second cord such that the internal space becomes more accessible by the user.

According to an exemplary embodiment, the first cord may be the trailing edge, and the second cord may be the leading edge.

According to an exemplary embodiment, the perimeter cord may further include a side leading edge and a side tailing edge on sides of the cargo net, respectively, and wherein the first cord and the second cord are the side trailing edge and the side leading edge, respectively.

According to an exemplary embodiment, the first cord may be one of the trailing connectors at one end of the trailing edge, and the second cord may be one of the leading connectors at the same end of the leading edge.

According to an exemplary embodiment, the first cord attachment portion may include a groove or an edge with an opening configured to engage with a first cord. The second cord attachment portion may include a groove or an edge with an opening configured to be engaged a second cord.

According to an exemplary embodiment, the first cord attachment portion may be configured to engage with the first cord in a non-removable way. The second cord attachment portion may be configured to engage with the second cord in a non-removable way.

According to an exemplary embodiment, the spanner may be rotatable around the first cord when the spanner engages only with the first cord by the first cord attachment portion.

According to an exemplary embodiment, the trailing edge may engage with a vehicle by two trailing connectors at two ends of the trailing edge. The leading edge may engage with the vehicle by two leading connectors at two ends of the leading edge. A side trailing edge and a side leading edge on sides of the cargo net engage with the vehicle by two side connectors, respectively.

In another embodiment, vehicles are provided that comprise an apparatus as disclosed herein.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1C:
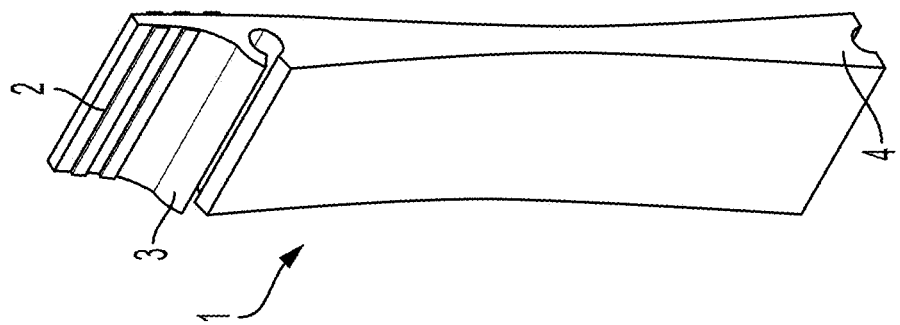
FIGS. 1A-1C are a top view, a side view, and a perspective view of a cargo net spanner, according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order, or sequence of the components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence, or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

As used herein, the term "engages" and its variations refer to the attaching, holding, clamping, gripping, grasping, securing, bringing, or coming together, and/or interlocking of various items and/or components.

As used herein, the term "substantially" and its variations as used herein are a broad term, and are to be given its ordinary and customary meaning to a person of ordinary skill in the art (and is not to be limited to a special or customized meaning), and refer without limitation to being largely but not necessarily wholly that which is specified. Alternatively, the term "substantially" and its variations mean at least 80%, 90% or 95%.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
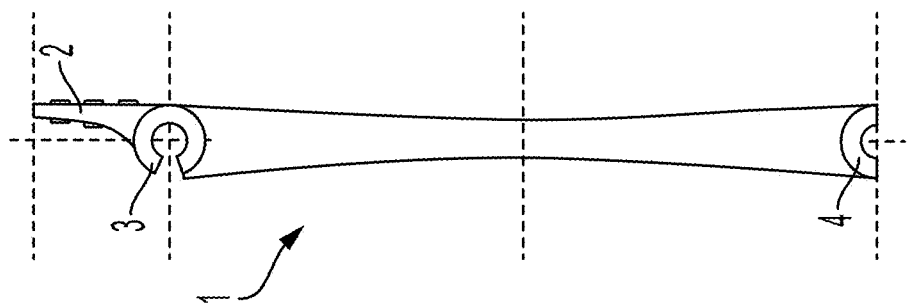
Figure 1A:
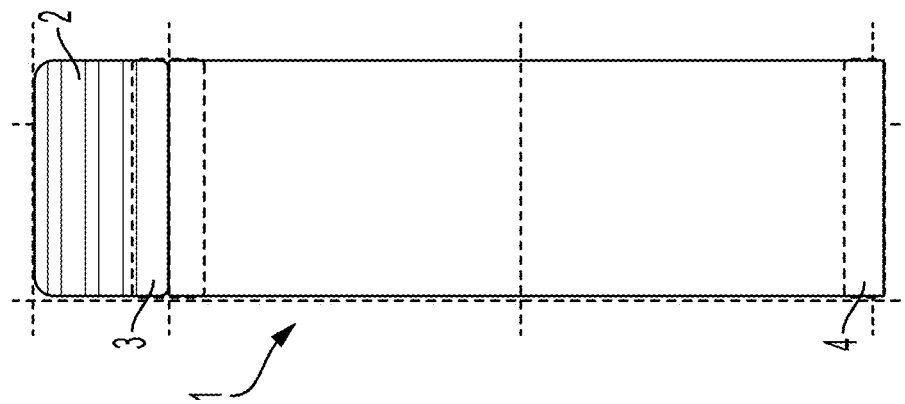

FIGS. 1A-1C are a top view, a side view, and a perspective view of a cargo net spanner, respectively, according to an exemplary embodiment of the present disclosure.

As shown in FIG. 1A-1C, a cargo net spanner 1 may be provided. The spanner 1 may include a tab 2 protruding longitudinally from a proximal end of the spanner 1; a first cord attachment portion 3 proximal to the tab 2; and a second cord attachment portion 4 at a distal end of the spanner 1. The first cord attachment portion 3 may be more proximal to the tab 2 than the second cord attachment portion 4.

The tab 2 may be configured to allow a user to control a movement of the spanner 1 (e.g., holding, pulling, spinning, pushing, etc.). For the purpose, the tab 2 may be at least partially made of a material good for gripping such as a rubber. Alternatively, the tab 2 may be at least partially coated by a material good for gripping. Alternative, the tab 2 may comprise an extra layer of a material good for gripping at least partially on the tab 2. Alternatively, the tab 2 may have a grooved or engraved surface at least partially. The tab 2 may be in the shape that is suitable for gripping (e.g., curved shape). The tab 2 may be slim enough so that an opening of a cargo net is fully or substantially fully closed.

The first cord attachment portion 3 may be configured to engage with a first cord (not shown). The second cord attachment portion 4 may be configured to engage with a second cord (not shown). The first cord and the second cord may be connected to each other at one point, or may not be connected to each other at all.

The spanner 1 may further have a body between the first cord attachment 3 and the second cord attachment 4. The body may have a shape that is suitable for gripping (e.g., curved shape). The body may have user instructions on its surface to increase feature awareness. The instructions may be printed, coated, or engraved on the surface. In some embodiments, parts of the spanner 1 may be delivered to a user, and the user may customize it using a 3D printing technology with, for example, a logo or a message. The user may be given a video demonstrating the customization. Alternatively, the spanner 11 may be customized by a user but later manufactured and delivered by a manufacturing company.

FIGS. 2A-2E are side views of various cargo net spanners with different types of first and second cord attachment portions 3, 4, according to an exemplary embodiment of the present disclosure.

Figure 2A:
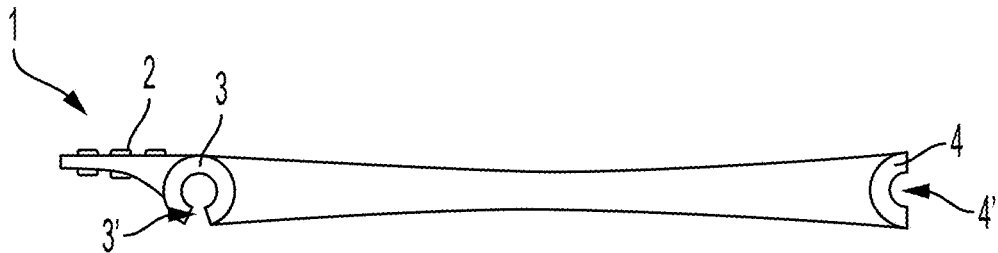
FIGS. 2A-2E are side views of various cargo net spanners with different types of first and second cord attachment portions, according to an exemplary embodiment of the present disclosure.
Figure 2B:
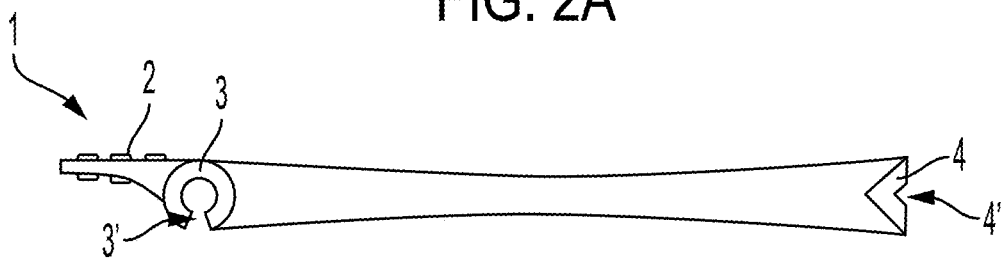
Figure 2C:

As shown in FIGS. 2A-2C, the first cord attachment portion 3 may include a groove or an edge with an opening 3' configured to be removably engaged with the first cord (not shown). The second cord attachment portion 4 may include a groove or an edge with an opening 4' configured to be removably engaged the second cord (not shown). The groove or edge may be circular, rectangular, triangular or in any shape suitable for the purpose of engaging with a cord. The groove or edge may be concave. The opening 3' may face a cord in a direction perpendicular to the longitudinal body of the spanner 1 or to the direction from which the tab 2 protrudes. Alternatively, the opening may face a cord in a direction parallel to the longitudinal body of the spanner 1 or to the direction from which the tab 2 protrudes. The opening 3' may have a width smaller than a width of a line cord to be engaged such that once engaged, it prevents the line cord from being easily disengaged from the opening 3'. Alternatively, the opening 3' may have a width substantially the same as a width of a line cord to be engaged. Alternatively, the opening 3' may have a width even larger width of a line cord to be engaged.

Figure 2D:
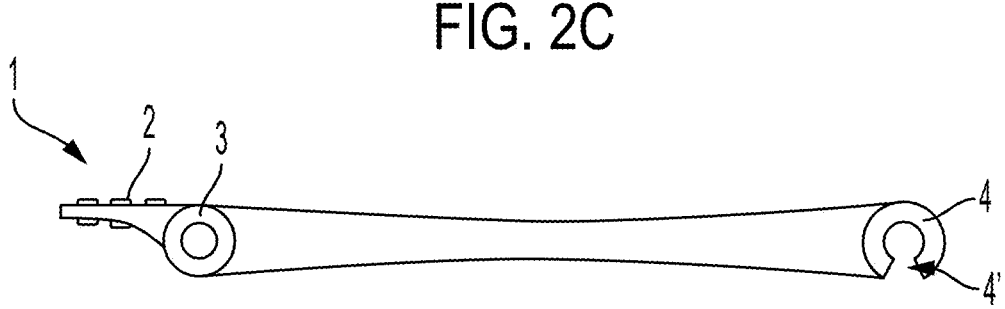

As shown in FIG. 2D, the first cord attachment portion 3 may be configured to engage with the first cord (not shown) in a non-removable way. For example, the first cord attachment portion may not have an opening that allows a user to remove the spanner from the first cord. A manufacturer or a user may be able to affix the spanner 1 to the first cord in a manner that is not easily removable. Alternatively, the first cord attachment portion 3 may be configured to engage with the first cord (not shown) in a substantially non-removable way. The second cord attachment portion 4 may include a groove or an edge with an opening 4' configured to be removably engaged the second cord (not shown). The second cord attachment portion 4 may be in the form a U-clip with an opening. The groove or edge may be circular, rectangular, triangular or in any shape suitable for the purpose of engaging with a cord. The groove or edge may be concave. The opening may face a cord in a direction perpendicular to the longitudinal body of the spanner 1 or to the direction from which the tab 2 protrudes. Alternatively, the opening may face a cord in a direction parallel to the longitudinal body of the spanner 1 or to the direction from which the tab 2 protrudes. The opening 3' may have a width smaller than a width of a line cord to be engaged such that once engaged, it prevents the line cord from being easily disengaged from the opening 3'. Alternatively, the opening 3' may have a width substantially the same as a width of a line cord to be engaged. Alternatively, the opening 3' may have a width even larger width of a line cord to be engaged.

Figure 2E:
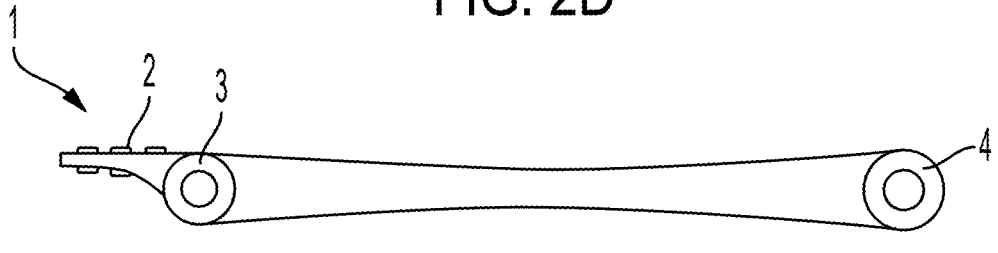

As shown in FIG. 2E, the first and cord attachment portions 3 and 4 may be configured to engage with the first cord (not shown) in a non-removable way. For example, the first and second cord attachment portions may not have an opening that allows a user to remove the spanner 1 from the first cord. The first and second cord attachment portions 3 and 4 may be configured to permanently engage with the first cord (not shown). Alternatively, the first and second cord attachment portions 3 and 4 may be configured to engage with the first cord (not shown) in a substantially non-removable way.

Figure 3A:
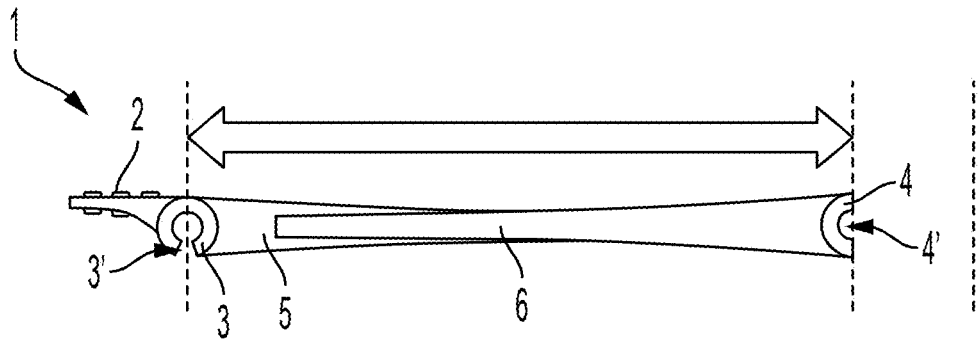
FIGS. 3A-3B are side views of an expandable cargo net spanner before expansion and after expansion, respectively, according to an exemplary embodiment of the present disclosure.
Figure 3B:
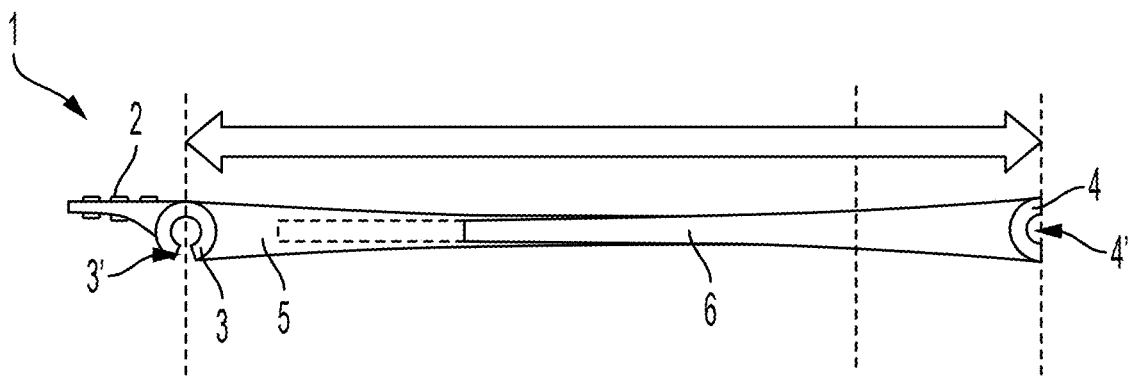

FIGS. 3A-3B are side views of an expandable cargo net spanner before expansion and after expansion, according to an exemplary embodiment of the present disclosure. The spanner 1 may include two parts; the first part 5 including the tab 2 and the first cord attachment portion 3, the second part 6 including the second cord attachment portion 4. The second part 6 may be housed in the first part 5 such that the second part 6 is allowed to move toward and move away from the first part 5, which may expand or extend the spanner 1. The spanner 1 after expansion or extension may be longer than the spanner 1 before expansion or extension. This allows a user to select an opening width of the envelope cargo net. Once expanded or extended, a device in the spanner 1 may prevent the spanner 1 from retracting to the original state, during use. After use, the device may also allow the spanner 1 to retract to the original state. The device may also allow a user to have a desirable length and maintain the length during use.

Figure 4:
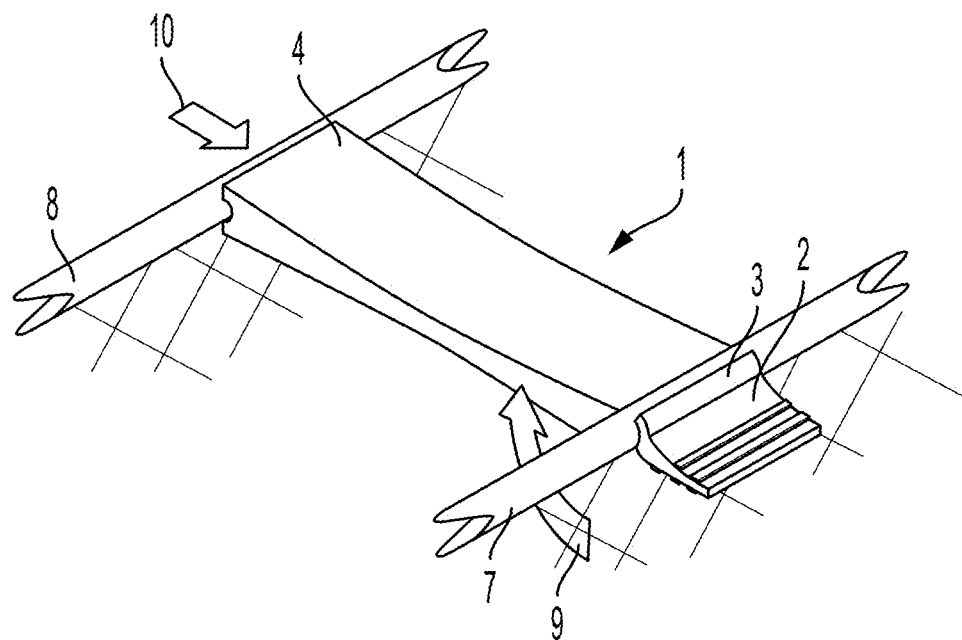
FIG. 4 is a perspective view of a cargo net spanner having a tab; a first cord attachment portion engaged with a first cord; and a second cord attachment portion engaged with a second cord, according to an exemplary embodiment of the present disclosure.

As shown in FIG. 4, the spanner 1 may be rotatable around the first cord 7 when the spanner 1 engages only with the first cord 7 by the first cord attachment portion 3, according to an exemplary embodiment of the present disclosure. When the spanner 1 engages only with the first cord 7 by the first cord attachment portion 3, the spanner 1 may rotate around the first cord 7 in the direction 9 such that the second cord 8 engages with the second cord attachment portion 4 by the restoring force of the second cord 8 (e.g., the cord tension) in the direction 10. The spanner 1 is then positioned between the first cord 7 and the second cord 8 such that a cargo net 12 holds opening between the first cord 7 and the second cord 8 open. The cargo spanner 1 may be made of any material that is capable of holding the opening open.

Figure 5A:
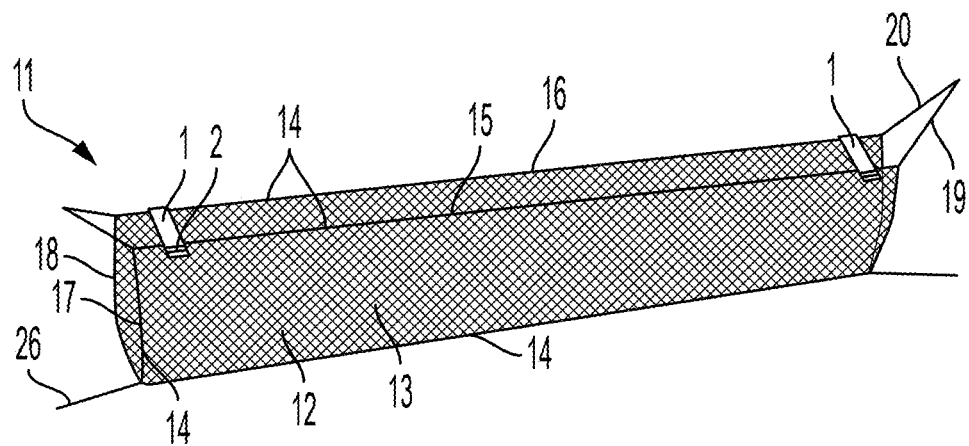
FIGS. 5A-5C depict different positions of a pair of cargo net spanners, according to an exemplary embodiment of the present disclosure.
Figure 5B:
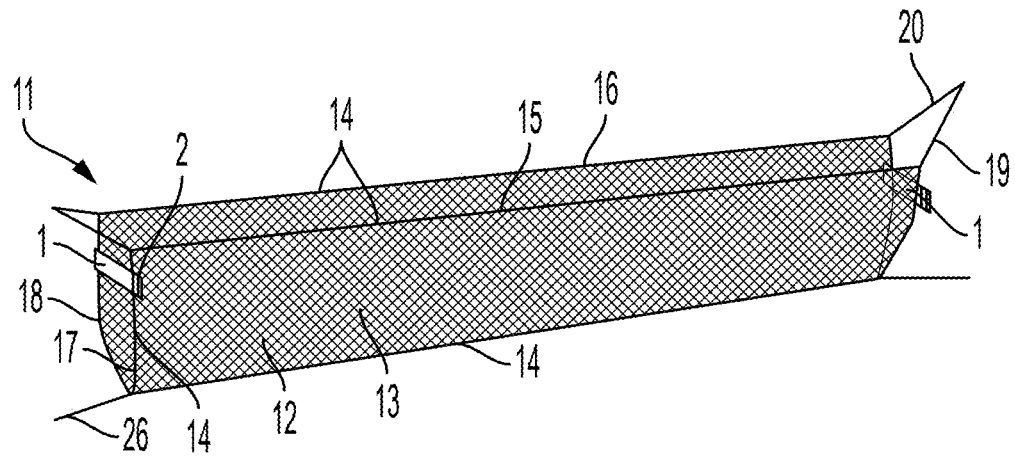
Figure 5C:
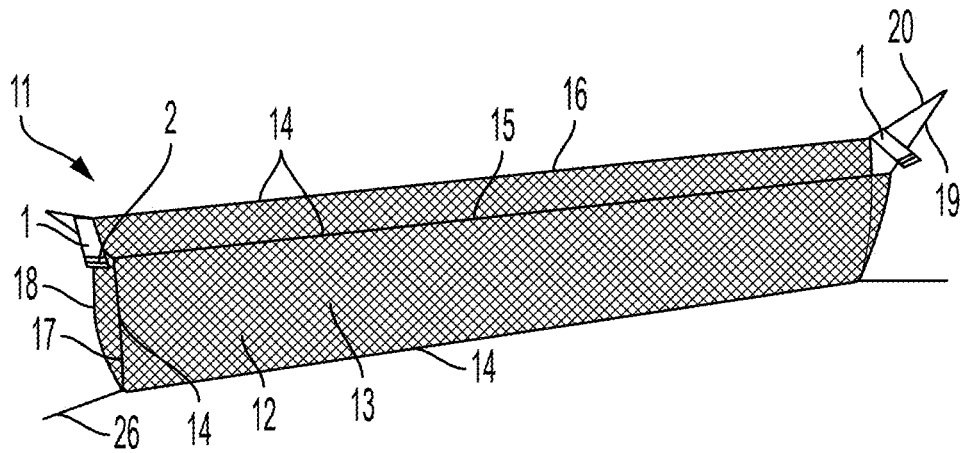

As shown in FIGS. 5A-5C, a cargo management system 11 is provided. The system 11 may include a cargo net 12 and a cargo net spanner 1, according to an exemplary embodiment of the present disclosure. The system may include a plurality of cargo net spanners 1. The cargo net 12 may include a flexible netting 13 surrounded by a perimeter cord 14 and configured to be folded to form an internal space. The perimeter cord 14 may include a trailing edge 15 and a leading edge 16. The cargo net spanner 1 may include a tab 2 protruding longitudinally from a proximal end of the spanner 1; a first cord attachment portion (not shown) proximal to the tab 2; and a second cord attachment portion (not shown) at a distal end of the spanner 1. The tab 2 may be configured to allow a user to control a movement of the spanner 1. The first cord attachment portion may be configured to engage with a first cord. The second cord attachment portion may be configured to engage with a second cord. When the first cord and the second cord attachment portions are respectively engaged with the first and the second cords, the spanner 1 may position between the first cord and second cord such that the internal space becomes more accessible by the user.

As shown in FIG. 5A, a pair of cargo net spanners 1 may be provided, each of which has a tab 2; a first cord attachment portion engaged with a trailing edge 15; and a second cord attachment portion engaged with a leading edge 16. The first cord attachment portion may be proximal to the tab 2, and the second cord attachment portion may be positioned at a distal end of the spanner 1. Alternatively and reversely, it is possible for the first cord attachment portion to be engaged with the leading edge 16; and a second cord attachment portion to be engaged with the trailing edge 15.

As shown in FIG. 5B, the perimeter cord may further include a side trailing edge 17 and a side leading edge 18 on sides of the cargo net 12, respectively. A pair of cargo net spanners 1 may be provided, each of which has a tab 2; a first cord attachment portion engaged with the side trailing edge 17; and a second cord attachment portion engaged with the side leading edge 18. The first cord attachment portion may be proximal to the tab 2, and the second cord attachment portion may be positioned at a distal end of the spanner 1. Alternatively and reversely, it is possible for the cord attachment portion to be engaged with the side leading edge 18; and a second cord attachment portion to be engaged with the side trailing edge 17.

As shown in FIG. 5C, a pair of cargo net spanners 1 may be provided, each of which has a tab 2; a first cord attachment portion engaged with a trailing connector 19; and a second cord attachment portion engaged with a leading connector 20. The trailing connector 19 may be connected to the trailing edge 15 at one end, and the leading connector 20 may be connected to the leading edge 16 at the same end. Each side of the cargo net 12 may be connected to the trailing connector 19 and the leading connector 20. The first cord attachment portion may be proximal to the tab 2, and the second cord attachment portion may be positioned at a distal end of the spanner 1. Alternatively and reversely, it is possible for the first cord attachment portion to be engaged with the leading connector 20; and a second cord attachment portion to be engaged with the trailing connector 19.

It is possible for a user to place the one or more spanners 1 between any combination of the line cords illustrated above. For example, a user may place one spanner between the trailing edge and the leading edge and another spanner between the side trailing edge and the side leading edge. A user may place three or more spanners between any combination of the line cords illustrated above to access, place, or deliver items in the internal space formed by the cargo net. It is also possible for a user to place the one or more spanners 1 at any desirable position of the line cords illustrated above.

The trailing edge 15 may engage with a vehicle by two trailing connectors 19 at two ends of the trailing edge 15. The leading edge 16 may engage with the vehicle by two leading connectors 20 at two ends of the leading edge 16. A side trailing edge 17 and a side leading edge 18 on sides of the cargo net engage with the vehicle by two side connectors 26, respectively.

Figure 6A:
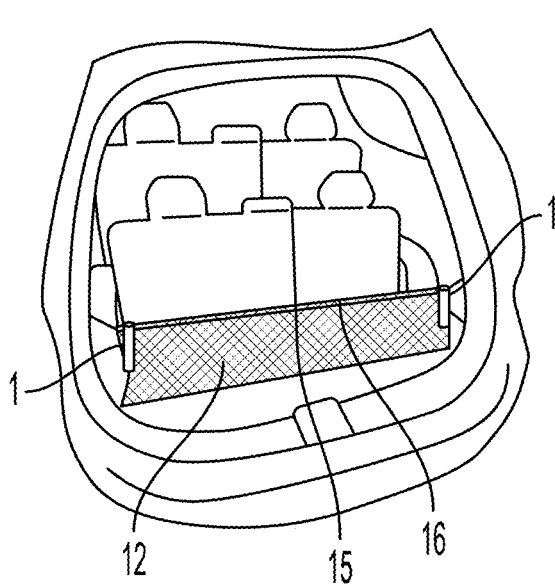
FIGS. 6A-6C depict a mechanism or process of engaging a cargo net spanner with a cargo net, according to an exemplary embodiment of the present disclosure.
Figure 6B:
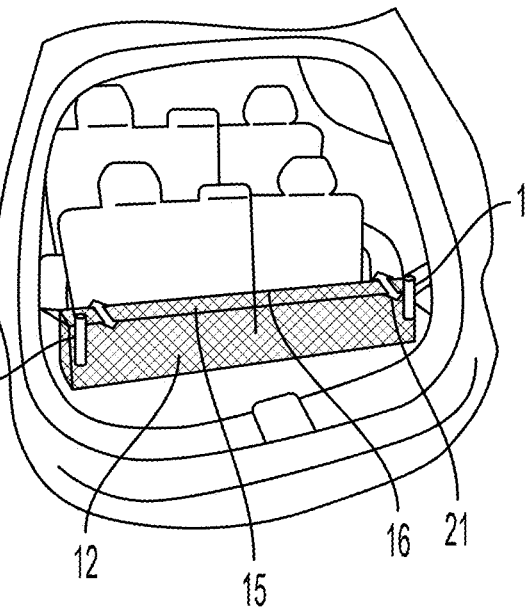
Figure 6C:
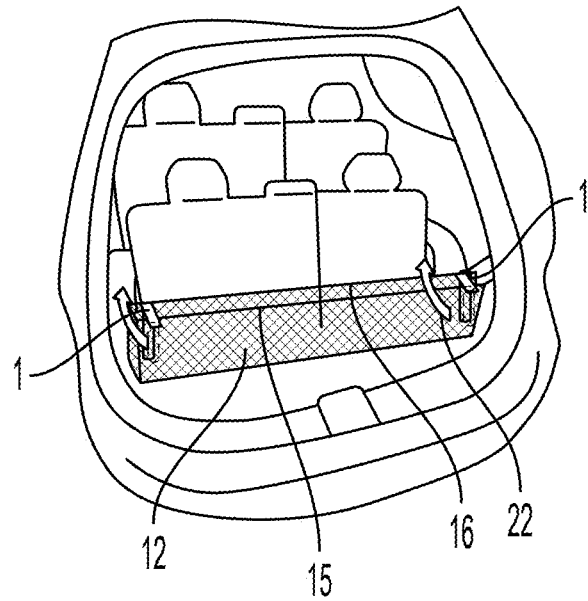

FIGS. 6A-6C describes a mechanism or process of engaging a cargo net spanner 1 with a cargo net 12, according to an exemplary embodiment of the present disclosure. As shown in FIG. 6A, the spanner 1 may be engaged with the trailing edge 15 but not yet engaged with the leading edge 16. As shown in FIG. 6B, a user can spread between the trailing edge 15 and the leading edge 16 so that an opening 21 is made between the edges 15, 16. As shown in FIG. 6C, a user then may control the tab 2 of the spanner 1 in a direction 22 such that the second cord attachment portion may engage with the leading edge 16. Then, the spanner 1 may be positioned between the edges 15 and 16 such that the opening 21 is maintained by the spanner 1 alone, without the user's additional control.

The cargo net 12 may engage with parts of the vehicle (e.g., vehicle frame or wall) through connectors. The parts may include devices to engage with the connectors. The parts may include four attachment portions, two of which engage with the trailing connector and leading connector. Other two portions may engage with two other connectors of the cargo net 12. Each of the two other connectors may be connected to the side trailing edge 17 and the side leading edge 18. The parts may include any number of attachment portions, depending on the cargo net 12.

Figures 7A, 7B:
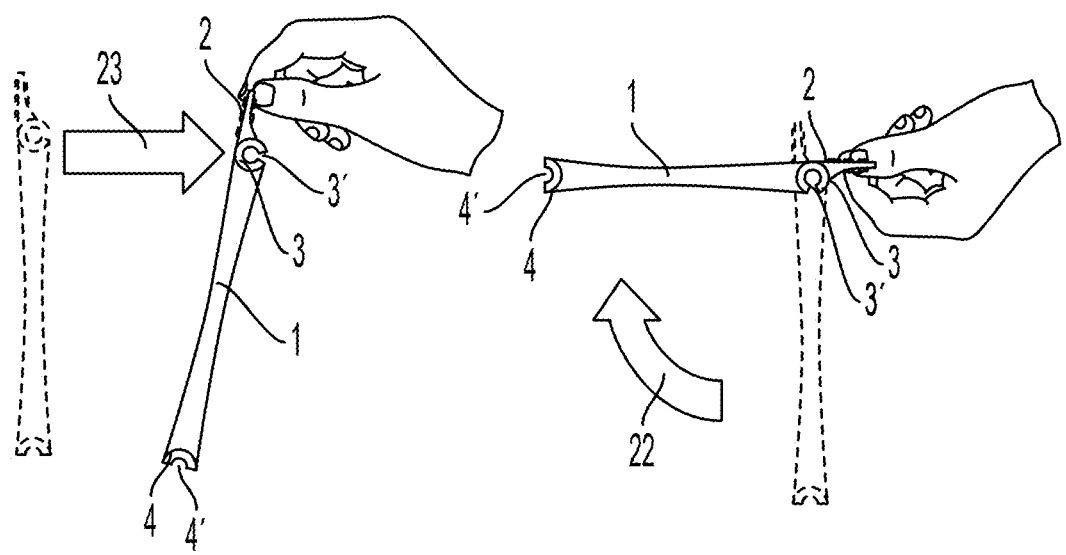
FIGS. 7A-7B describe movements of a cargo net spanner by a user for the engagement of the cargo net spanner with a cargo net, according to an exemplary embodiment of the present disclosure.

FIG. 7A-7B movements of a cargo net spanner by a user for the engagement of the cargo net spanner with a cargo net, according to an exemplary embodiment of the present disclosure. As shown in FIG. 7A, a user may be able to control and rotate the spanner 1 by pulling on the tab 2 using a hand in a direction 23. Then, as shown in FIG. 7B, the user may be able rotate the tab 2 in a direction 22 until the tab 2 levels with the second cord, for example, the leading edge 16, the side leading edge 18, the leading connector 20, etc., so that the second cord attachment portion 4 may engage with the second cord. The second court attachment portion 4 and the second cord may have a magnetic portion so that they easily stick together and aid the leveling process.

Figures 8A, 8B:
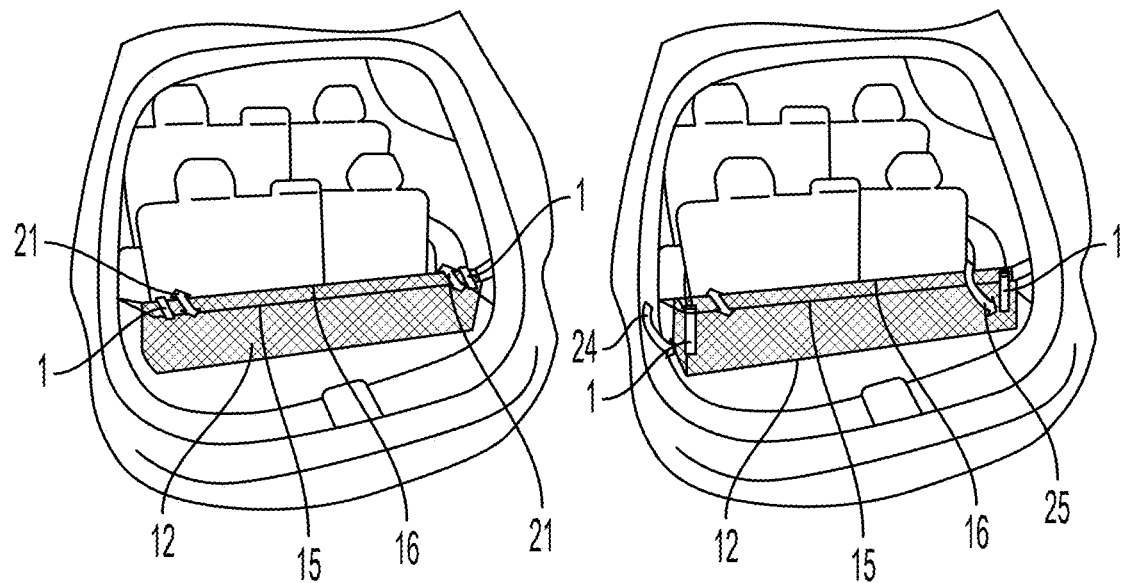
FIGS. 8A-8C depict a mechanism or process of disengaging a cargo net spanner with a cargo net, according to an exemplary embodiment of the present disclosure.
Figure 8C:
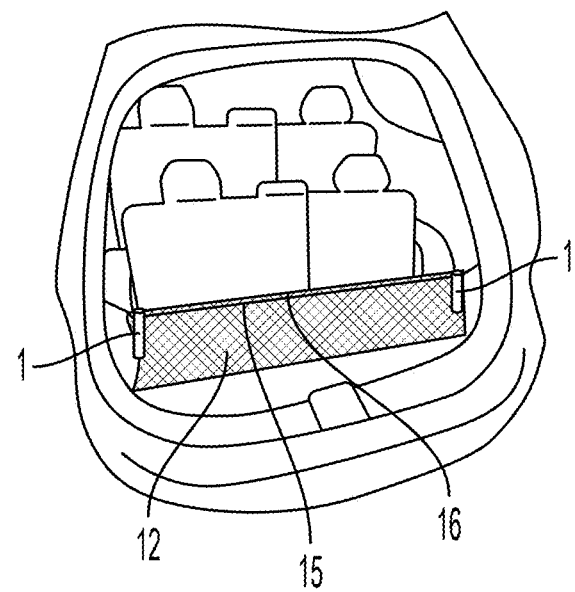

FIGS. 8A-8C depict a mechanism or process of disengaging a cargo net spanner 1 with a cargo net 12, according to an exemplary embodiment of the present disclosure. As shown in FIG. 8A, a user can spread between the trailing edge 15 and the leading edge 16 so that an opening 21 is extended or enlarged between the edges 15, 16. This allows the user to disengage the second cord attachment portion of the spanner 1 from the second cord, for example, the leading edge 16, the side leading edge 18, the leading connector 20, etc. After the disengagement, as shown in FIG. 8B, only the first cord attachment portion of the spanner 1 is engaged with the first cord, for example, the trailing edge 16, the side trailing edge 18, the trailing connector 20, etc. The spanner 1 may rotate downward in a direction 25 by gravity. Alternatively, the movement may be made by the user. Then, as shown in FIG. 8C, because there is nothing between the trailing edge 15 and the leading edge 16, the opening 21 may be closed or less accessible by the user due to the restoring force (e.g., the cord tension).

Figure 9A:
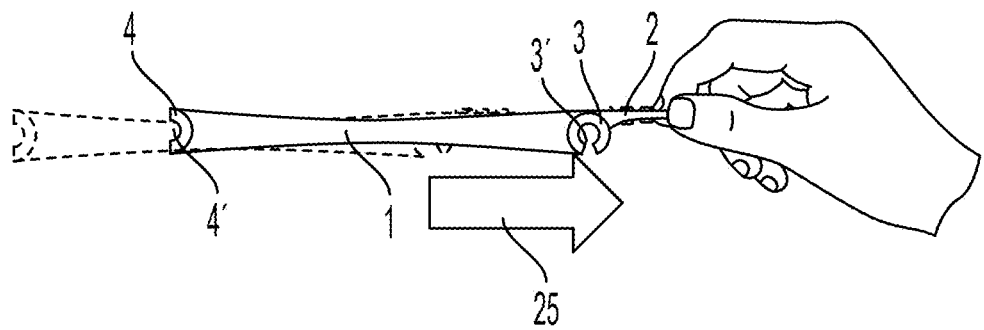
FIGS. 9A-9B describe movements of a cargo net spanner by a user for the disengagement of the cargo net spanner with a cargo net, according to an exemplary embodiment of the present disclosure.
Figure 9B:
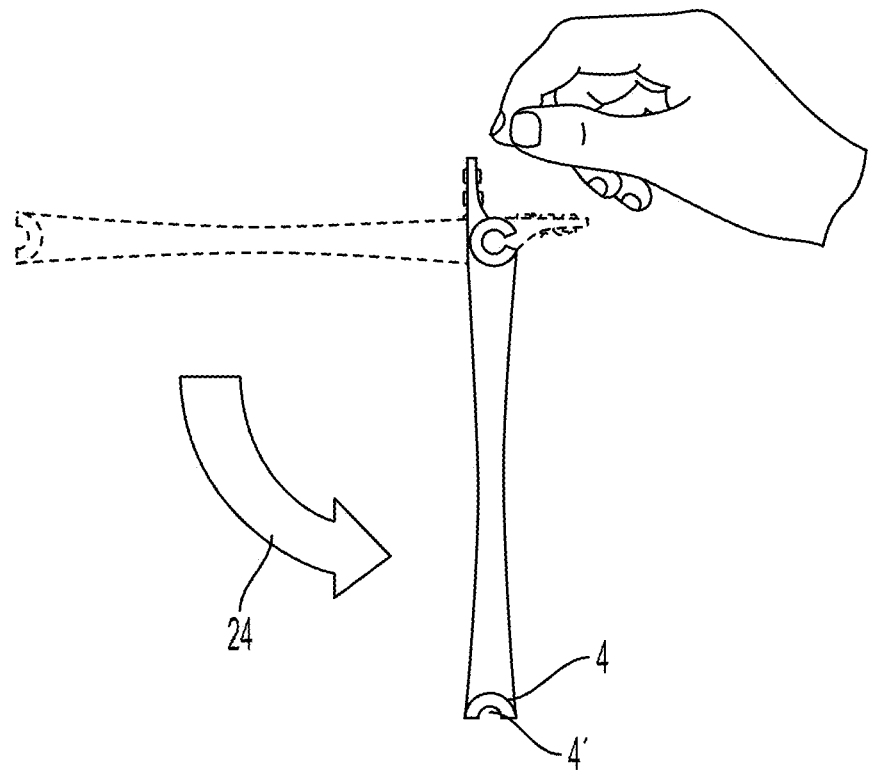

FIGS. 9A-9B describe movements of a cargo net spanner 1 by a user for the disengagement of the cargo net spanner 1 with a cargo net 12, according to an exemplary embodiment of the present disclosure. When disengaging the second cord attachment portion of the spanner from the second cord, the user can pull the tab 2 away from the second cord in a direction 25. Similarly, the second cord attachment portion of the spanner 1 from the second cord, for example, the leading edge 16, the side leading edge 18, the leading connector 20, etc. The spanner 1 may rotate downward in a direction 24 by gravity.

Although exemplary embodiments of the present disclosure have been described for illustrative purposes, those skilled in the art will appreciate that various modifications, additions, and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A cargo net spanner, the spanner comprising:
   a tab protruding longitudinally from a proximal end of the spanner, the tab configured to allow a user to control a movement of the spanner;
   a first cord attachment portion proximal to the tab, the first cord attachment portion configured to engage with a first cord;
   a second cord attachment portion at a distal end of the spanner, the second cord attachment portion configured to engage with a second cord; and
   a longitudinal body between the first cord attachment portion and the second cord attachment portion,
   wherein the first cord attachment portion comprises a groove or an edge with an opening configured to be removably engaged with the first cord,
   wherein the second cord attachment portion comprises a groove or an edge with an opening configured to be removably engaged with the second cord,
   wherein the spanner is rotatable around the first cord when the spanner engages only with the first cord by the first cord attachment portion,
   wherein the opening of the first cord attachment portion faces a direction perpendicular to the longitudinal body and has a width less than a width of the first cord, and
   wherein the opening of the second cord attachment portion faces a direction parallel to the longitudinal body and has a width greater than or equal to a width of the second cord.

2. A cargo management system, the system comprising:
   a cargo net comprising:
      a flexible netting surrounded by a perimeter cord and configured to be folded to form an internal space,
      wherein the perimeter cord comprises a trailing edge and a leading edge, and a cargo net spanner, the spanner comprising:
   a tab protruding longitudinally from a proximal end of the spanner, the tab configured to allow a user to control a movement of the spanner;
   a first cord attachment portion proximal to the tab, the first cord attachment portion configured to engage with a first cord;
   a second cord attachment portion at a distal end of the spanner, the second cord attachment portion configured to engage with a second cord; and
   a longitudinal body between the first cord attachment portion and the second cord attachment portion,
   wherein when the first cord and the second cord attachment portions are respectively engaged with the first and the second cords, the spanner positions between the first cord and second cord such that the internal space becomes more accessible by the user,
   wherein the first cord attachment portion comprises a groove or an edge with an opening configured to be removably engaged with the first cord,
   wherein the second cord attachment portion comprises a groove or an edge with an opening configured to be removably engaged with the second cord,
   wherein the spanner is rotatable around the first cord when the spanner engages only with the first cord by the first cord attachment portion,
   wherein the opening of the first cord attachment portion faces a direction perpendicular to the longitudinal body and has a width less than a width of the first cord, and
   wherein the opening of the second cord attachment portion faces a direction parallel to the longitudinal body and has a width greater than or equal to a width of the second cord.

3. The system of claim 2, wherein the first cord is the trailing edge, and the second cord is the leading edge.

4. The system of claim 2, wherein the perimeter cord further comprises a side leading edge and a side tailing edge on sides of the cargo net, respectively, and wherein the first cord and the second cord are the side trailing edge and the side leading edge, respectively.

5. The system of claim 2, wherein the trailing edge engages with a vehicle by two trailing connectors at two ends of the trailing edge, and the leading edge engages with the vehicle by two leading connectors at two ends of the leading edge, and
   wherein the first cord is one of the trailing connectors at one end of the trailing edge, and the second cord is one of the leading connectors at the same end of the leading edge.

6. The system of claim 2, wherein the trailing edge engages with a vehicle by two trailing connectors at two ends of the trailing edge; the leading edge engages with the vehicle by two leading connectors at two ends of the leading edge; and a side trailing edge and a side leading edge on sides of the cargo net engage with the vehicle by two side connectors, respectively.

7. A cargo management system, the system comprising:
   a cargo net comprising:
      a flexible netting surrounded by a perimeter cord and configured to be folded form an internal space,
      wherein the perimeter cord comprises a trailing edge and a leading edge, and a plurality of cargo net spanners, each of the spanners comprising:
- a tab protruding longitudinally from a proximal end of the spanner, the tab configured to allow a user to control a movement of the spanner;
- a first cord attachment portion proximal to the tab, the first cord attachment portion configured to engage with a first cord;
- a second cord attachment portion at a distal end of the spanner, the second cord attachment portion configured to engage with a second cord; and
- a longitudinal body between the first cord attachment portion and the second cord attachment portion, wherein when the first cord and the second cord attachment portions are respectively engaged with the first and the second cords, the plurality of cargo net spanners are respectively positioned between the first cord and second cord such that the internal space becomes more accessible by the user, wherein the first cord attachment portion comprises a groove or an edge with an opening configured to be removably engaged with the first cord, wherein the second cord attachment portion comprises a groove or an edge with an opening configured to be removably engaged with the second cord, wherein the spanner is rotatable around the first cord when the spanner engages only with the first cord by the first cord attachment portion, wherein the opening of the first cord attachment portion faces a direction perpendicular to the longitudinal body and has a width less than a width of the first cord, and wherein the opening of the second cord attachment portion faces a direction parallel to the longitudinal body and has a width greater than or equal to a width of the second cord.

8. The system of claim 7, wherein the first cord is the trailing edge, and the second cord is the leading edge.

9. The system of claim 7, wherein the perimeter cord further comprises a side leading edge and a side tailing edge on sides of the cargo net, respectively, and wherein the first cord and the second cord are the side trailing edge and the side leading edge, respectively.

10. The system of claim 7, wherein the trailing edge engages with the vehicle by two trailing connectors at two ends of the trailing edge, and the leading edge engages with the vehicle by two leading connectors at two ends of the leading edge, and wherein the first cord is one of the trailing connectors at one end of the trailing edge, and the second cord is one of the leading connectors at the same end of the leading edge.

11. The system of claim 7, wherein the trailing edge engages with a vehicle by two trailing connectors at two ends of the trailing edge; the leading edge engages with the vehicle by two leading connectors at two ends of the leading edge; and a side trailing edge and a side leading edge on sides of the cargo net engage with the vehicle by two side connectors, respectively.

* * * * *